United States Patent [19]

Kawabe et al.

[11] Patent Number: 5,224,532
[45] Date of Patent: Jul. 6, 1993

[54] METHOD FOR ASSEMBLING TIRE AND RIM AND FILLING INNER PRESSURE

[75] Inventors: Hiroshi Kawabe; Toshiyuki Watanabe; Naotaka Tomita, all of Kodaira, Japan

[73] Assignee: Bridgestone Corporation, Tokyo, Japan

[21] Appl. No.: 811,234

[22] Filed: Dec. 20, 1991

[30] Foreign Application Priority Data

Dec. 26, 1990 [JP] Japan ................................ 2-414104
Sep. 5, 1991 [JP] Japan ................................ 3-226003

[51] Int. Cl.$^5$ ........................................... B60C 25/07
[52] U.S. Cl. ........................................ 157/1; 157/1.24
[58] Field of Search ................ 157/1, 1.1, 1.17, 1.2, 157/1.22, 1.24, 1.26, 1.28

[56] References Cited

U.S. PATENT DOCUMENTS 2,546,988  4/1951  Eberly .
3,557,862  8/1969  Mains .

FOREIGN PATENT DOCUMENTS 888537   4/1981  Belgium .
0175411  3/1986  European Pat. Off. .
815829   7/1937  France .
2369107  5/1978  France .
50-104302  8/1975  Japan .
1-16404   1/1989  Japan .

Primary Examiner—D. S. Meislin
Attorney, Agent, or Firm—Sughrue, Mion, Zinn, Macpeak & Seas

[57] ABSTRACT

A method and an apparatus for fitting bead portions of the tire onto a wheel substantially uniformly and at the same time for filling inner pressure into the tire. A wheel cap-shaped jig in the form of a disc is arranged on the side surface of the wheel. The periphery of the wheel cap-shaped jig progressively reduces outwardly in the rotating axial direction of the wheel. The tire is then obliquely arranged on the wheel through the wheel cap-shaped jig, and the bead portions are radially outwardly expanded along their circumferences so as to assemble onto the rim. An outer cylindrical member having an inclined annular end surface and an inner cylindrical member telescopically arranged in the outer cylindrical member are brought into air-tight contact with the rim and a side surface of the tire, respectively. While inner pressure is filled into the tire through the clearance between the wheel and the bead portion of the tire, the outer cylindrical member is lowered relative to the inner cylindrical member to bring the bead portions into close contact with the rim.

4 Claims, 10 Drawing Sheets

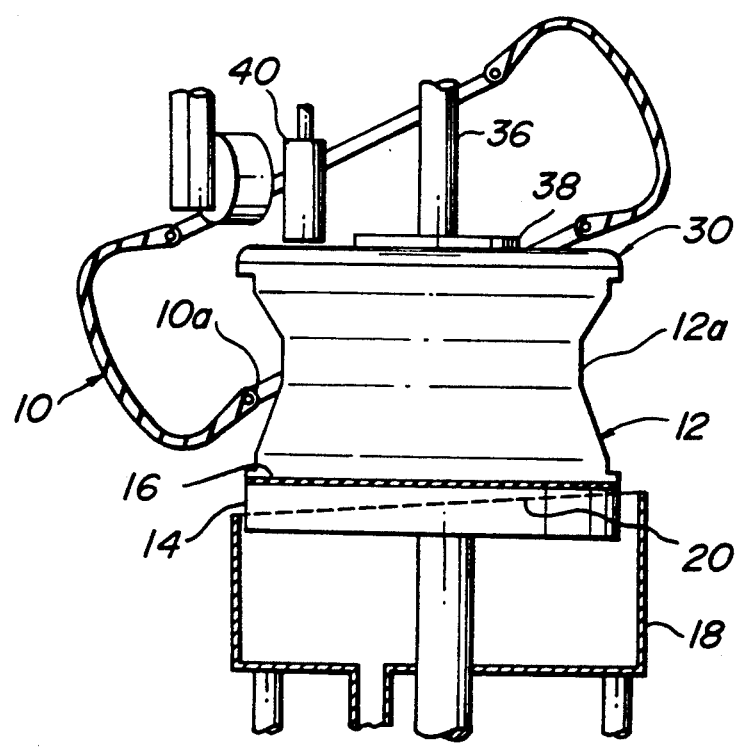
FIG_1

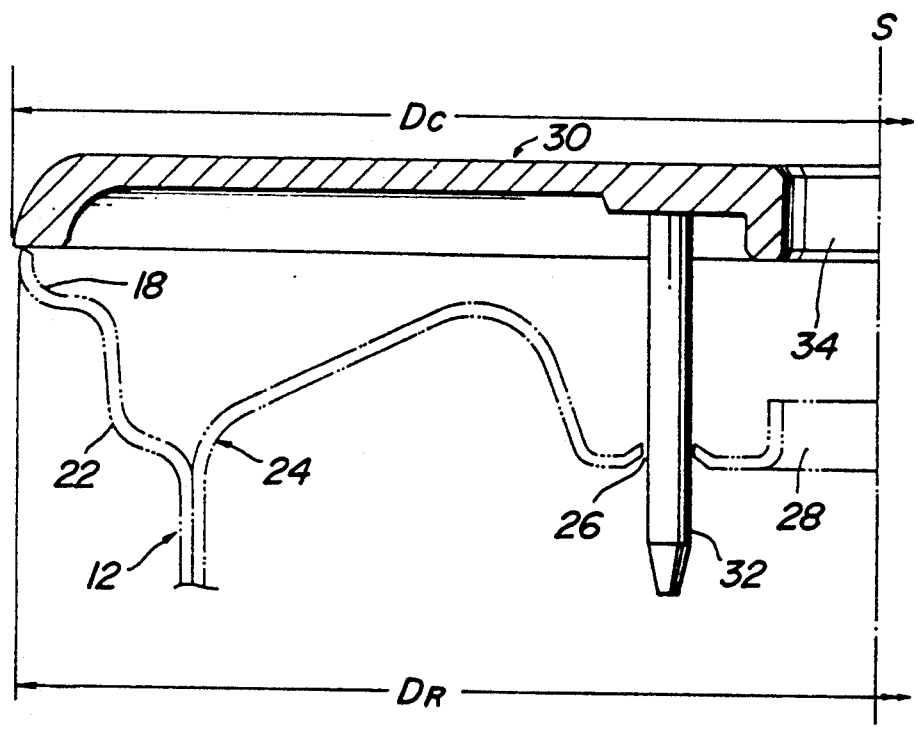
FIG_2

FIG_3a
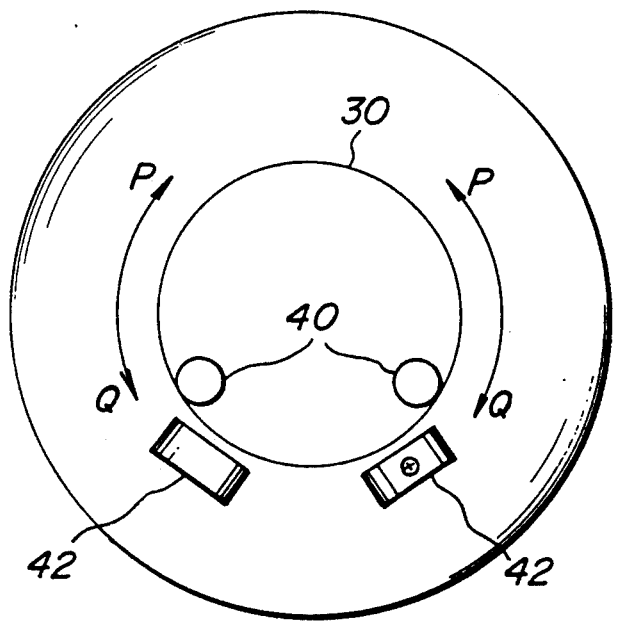
FIG_3b
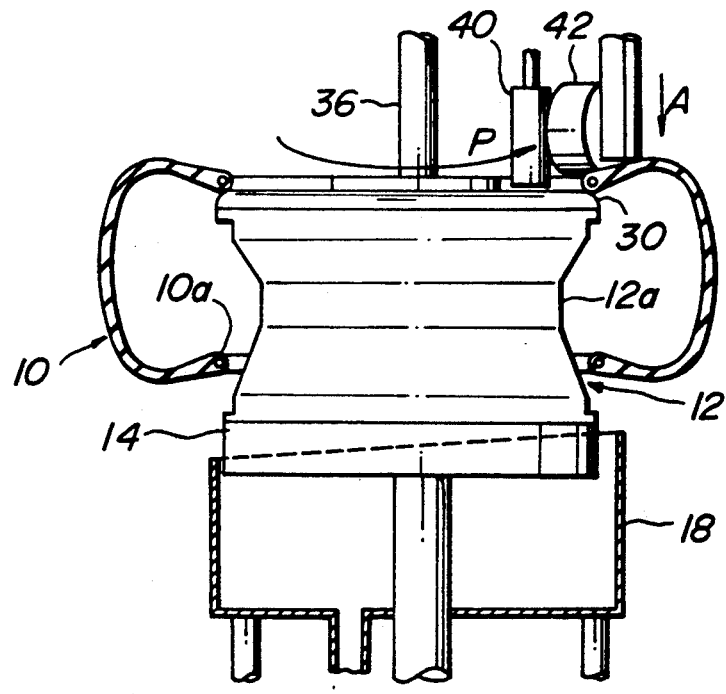

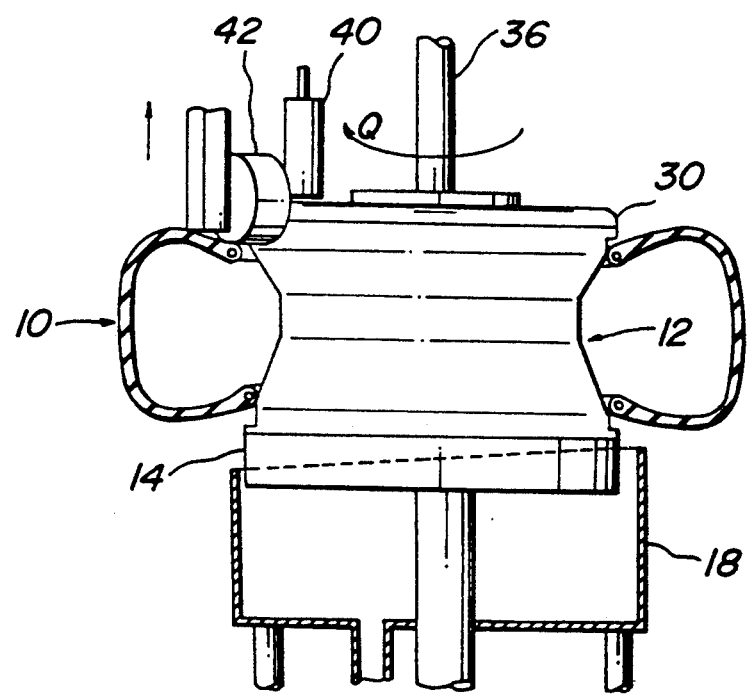
FIG_4

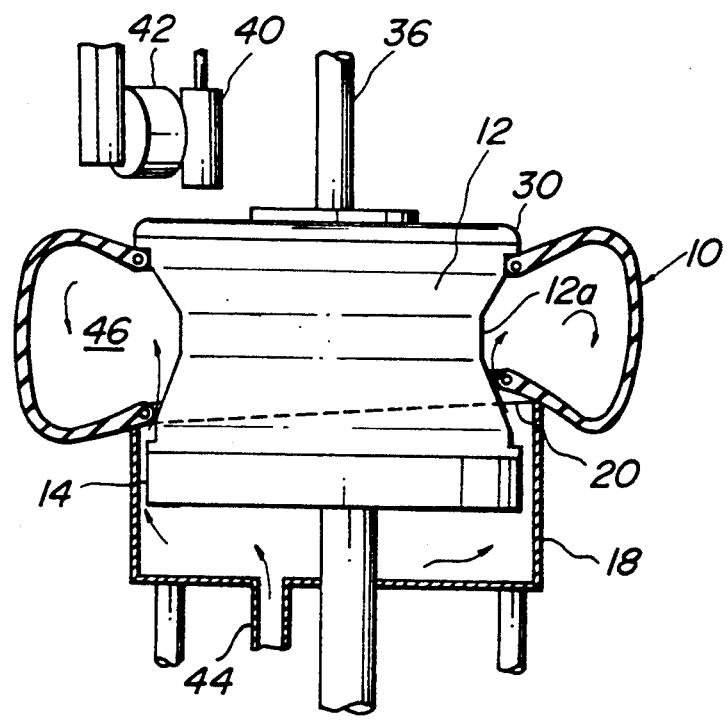
*FIG_5a*
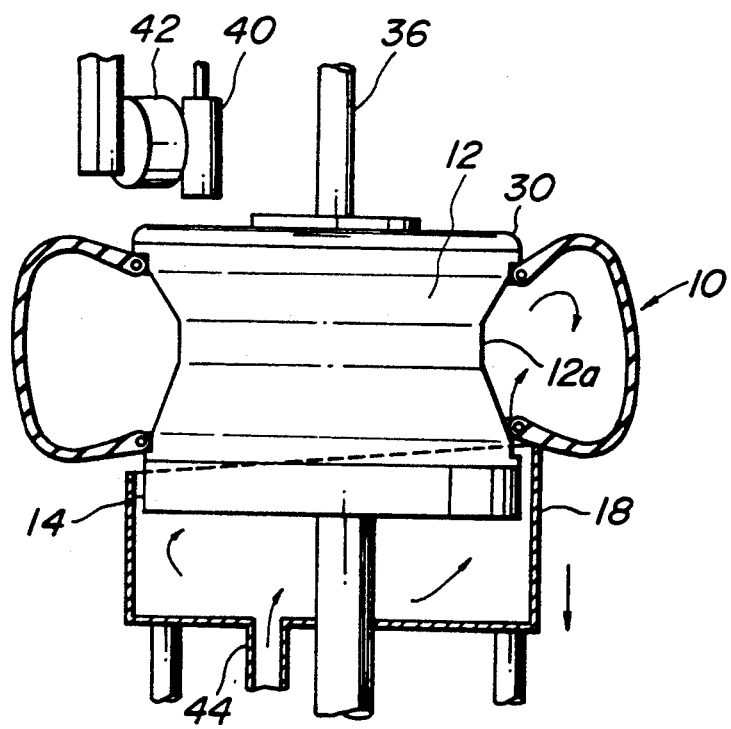
*FIG_5b*

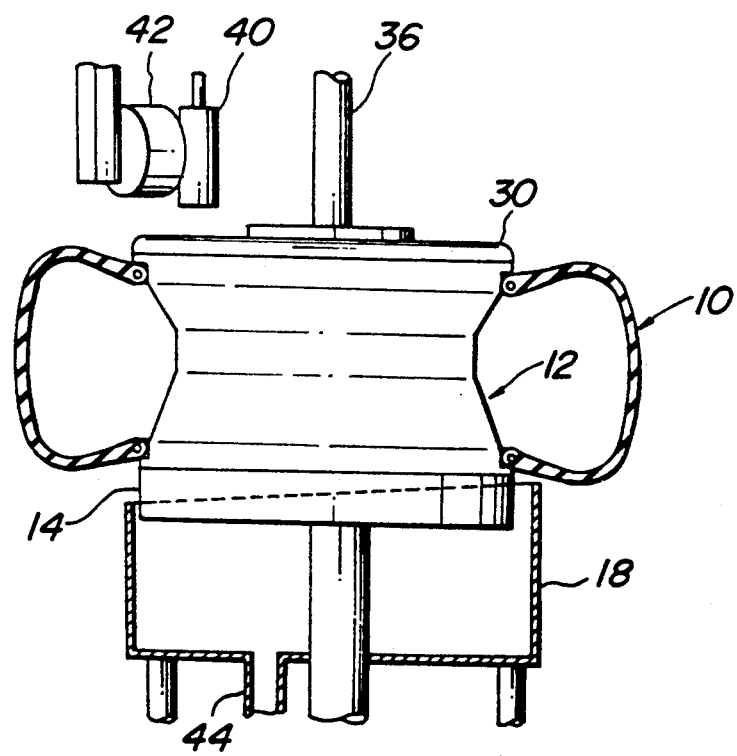
FIG_6

FIG_7
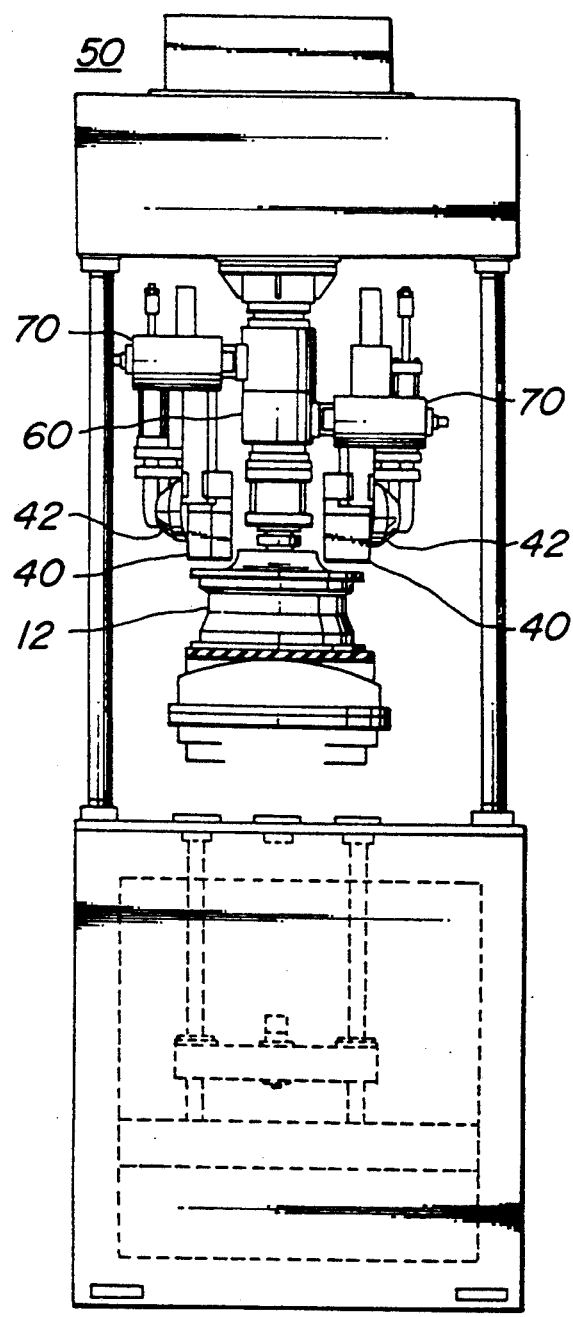

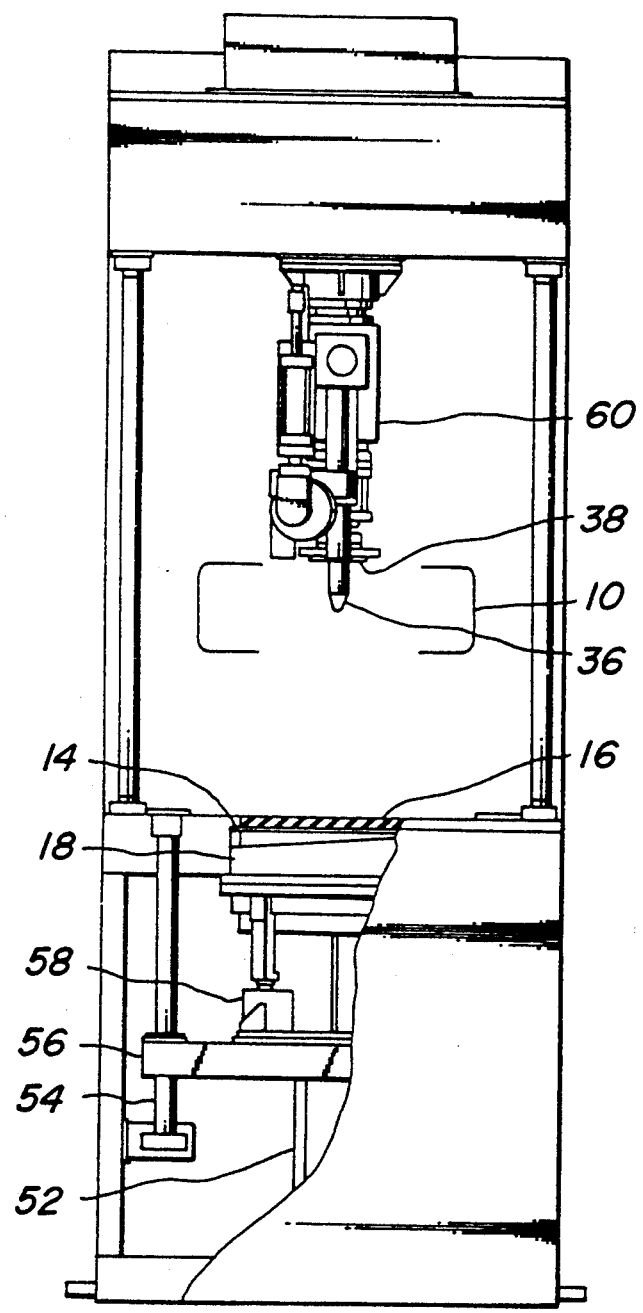
FIG_8

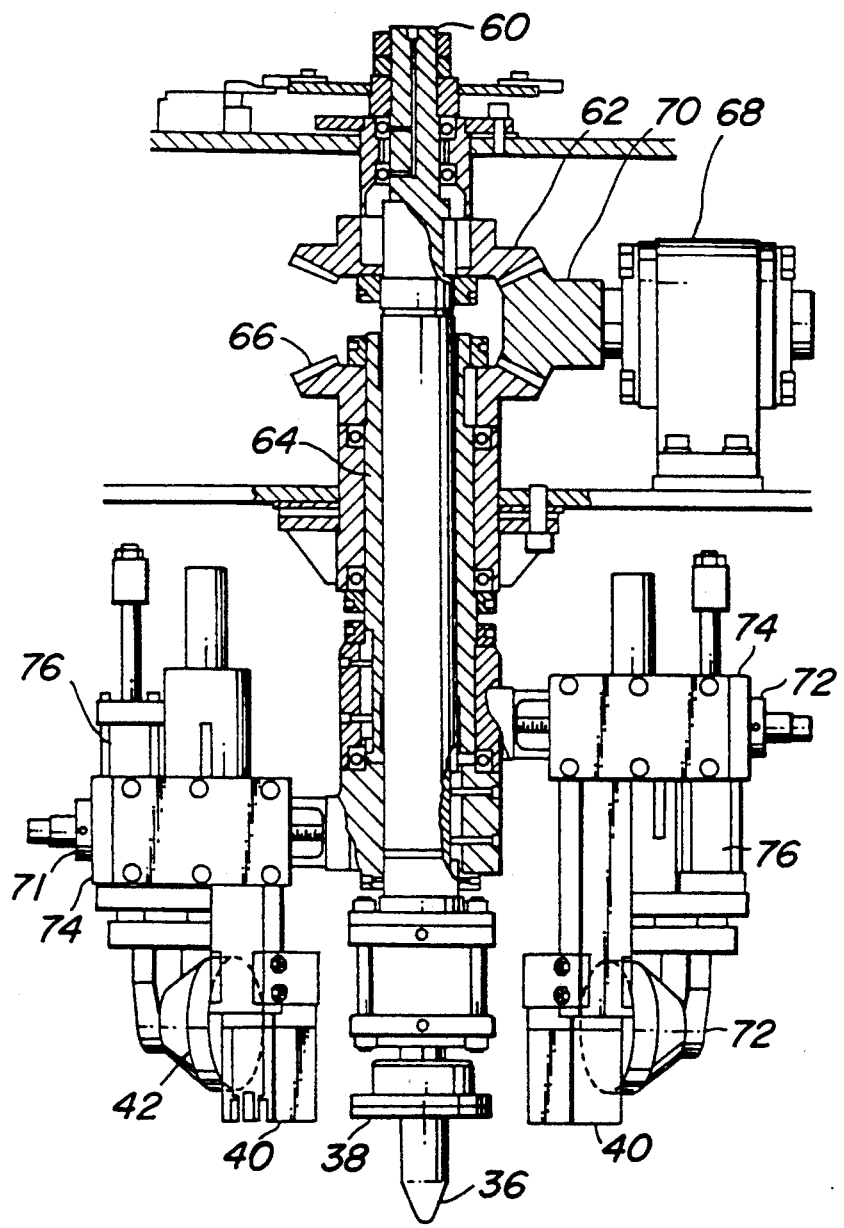
FIG_9

FIG_10a
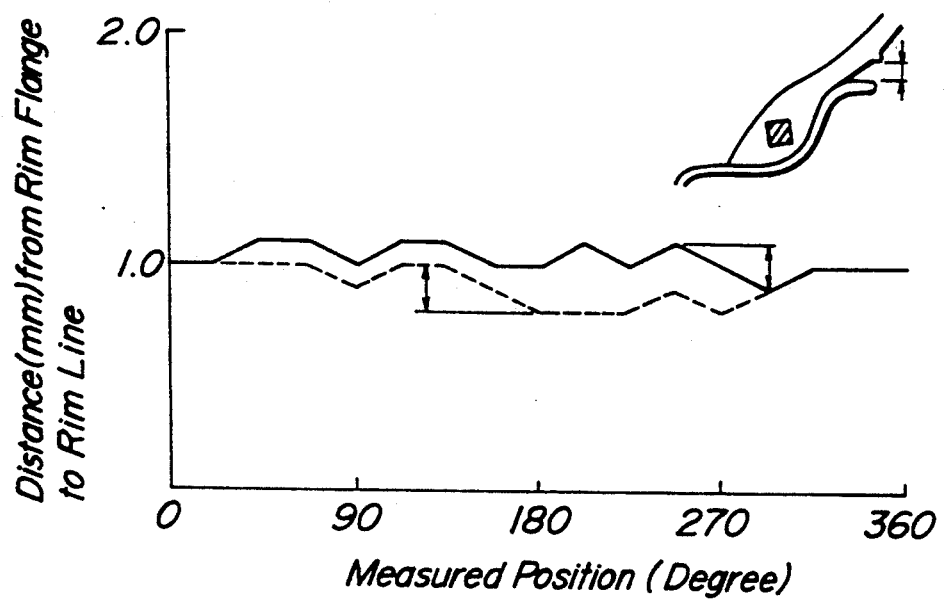
FIG_10b
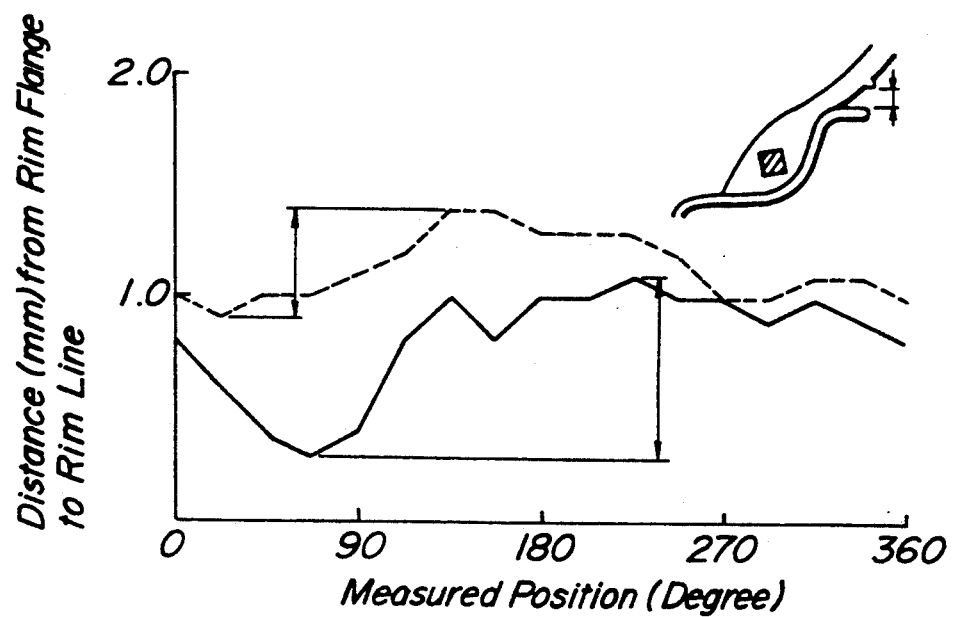

METHOD FOR ASSEMBLING TIRE AND RIM AND FILLING INNER PRESSURE

BACKGROUND OF THE INVENTION

This invention relates to a method for mounting a tire on a wheel with bead portions of the tire substantially uniformly fitted on the rim of the wheel and filling the tire with inner pressure.

In a conventional method for mounting a tire on a wheel, bead portions of the tire are first fitted on the rim of the wheel by the use of a tire-rim assembling apparatus, and the tire mounted on the wheel is subsequently filled with inner pressure by means of an air filling apparatus separate from the tire-rim assembling apparatus.

For example, a tire-rim assembling apparatus is disclosed in Japanese Utility Model Application Laid-open No. 50-104,302. In mounting a tire on a wheel with this prior art apparatus, the wheel is arranged on a table vertically movable and fixed thereat by means of an extensible and contractible center cone inserted into the hub hole formed in the center of the wheel. The tire is then arranged on the wheel in an inclined state so that a part of one bead portion of the tire is dropped into a well formed in one side region of the rim of the wheel. By rotating a swivel arm coaxially provided on the center cone, bead portions of the tire are expanded by guide rollers provided on the swivel arm and a side surface rubber of the tire is urged downwardly by restraining rollers vertically movably provided on the swivel arm. As a result, the bead portions of the tire are fitted one by one or simultaneously on the rim of the wheel.

On the other hand, an inner pressure filling apparatus is disclosed in Japanese Utility Model Application Laid-open No. 64-16,404, in which a side surface of a tire mounted on the rim of a wheel is urged downwardly by raising a table to form a filling opening between the bead portion of the tire and the wheel, through which opening pressurized air is filled within the tire. With this apparatus, pressurized air higher than the predetermined inner pressure must be applied into the tire for the purpose of supplementing the loss of the pressurized air due to its leakage from the tire caused by the lowering movement of the table.

In mounting the tire onto the rim by the use of the tire-rim assembling apparatus of the prior art, a portion of the bead portion not yet completely fitted on the rim is deformed straight like a chord relative to the annular flange of the rim shortly before the termination of the fitting operation. In this state, the guide rollers and the restraining rollers are further rolled so that the bead portion is expanded to be locally bent or curved and may be damaged as the case may be. Even if the bead portion of the tire is not damaged, the deformed bead portion detrimentally affects tire uniformity and sealing performance so that the inherent performance of the tire mounted on the rim could not be exhibited.

On the other hand, with the inner pressure filling apparatus of the prior art, the bead portions of the tire must instantaneously move or ride over the hump of the rim so as to be brought into contact with the rim. It is therefore required to supply pressurized air (4 to 6 kg/cm$^2$) into the tire, which is higher than a set pressure (3 to 5 kg/cm$^2$). Moreover, as the table is rapidly lowered in order to increase the efficiency of the inner pressure filling operation, the bead portions are abruptly urged against the flanges of the rim of the wheel. Therefore, it is difficult to assure uniform close contact between the bead portions of the tire and the flanges of the rim. Further, bead cores are likely to be deformed undesirably.

In addition thereto, a tire-rim assembling apparatus and an inner pressure filling apparatus must be separately provided in the prior art. Therefore, wide spaces are required for installing this apparatus.

SUMMARY OF THE INVENTION

It is an object of the invention to provide a method for mounting a tire on a rim and filling inner pressure into the tire, which eliminates all the disadvantages of the prior art and which is able to perform tire and rim assembling without causing deformations of bead portions of the tire and inner pressure filling with pressurized air of a relatively lower pressure to uniformly close contact the bead portion to the rim.

In order to accomplish this object, in a method for assembling a tire and a wheel and filling inner pressure into the tire, the wheel having a rim for mounting and holding the tire thereon and a disc formed with a plurality of bolt-through apertures, the method according to the invention comprises steps of providing an inner cylindrical member vertically movable and having a support surface engageable with one end of the rim in an air-tight manner and an outer cylindrical member telescopically arranged on the outer side of the inner cylindrical member and having an annular end surface inclined to the rotating axis of the wheel and engageable with a side surface of the tire in an air-tight manner; arranging the wheel on the support surface of the inner cylindrical member such that the rotating axis of the wheel is substantially perpendicular to the support surface; arranging a wheel cap-shaped jig substantially in the form of a disc on the end surface of the wheel remote from the support surface, said wheel cap-shaped jig having a periphery being progressively reduced in the rotating axial direction as being remoter from the wheel and the maximum diameter being not smaller than the outer diameter of the rim and further provided with a pin engageable in at least one bolt-through aperture of the wheel; arranging the tire to be assembled on the wheel through said wheel cap-shaped jig so as to be inclined relative to the wheel; progressively expanding bead portions of the tire radially outwardly to assemble them onto the rim along their circumferences; bringing the inner cylindrical member into an air-tight engagement with the rim and the outer cylindrical member into an air-tight engagement with the side surface of the tire; and applying inner pressure into the tire through a clearance between the bead portion and the rim, while lowering the outer cylindrical member, thereby progressively fitting the bead portions onto the rim and filling the inner pressure into the tire.

Moreover, in an apparatus for assembling a tire and a wheel and filling inner pressure into the tire, the wheel having a rim for mounting and holding the tire thereon and a disc formed with a plurality of bolt-through apertures, the apparatus according to the invention comprises an inner cylindrical member vertically movable and having a support surface engageable with one end of the rim in an air-tight manner and supporting thereon the wheel whose rotating axis is perpendicular to the support surface; an outer cylindrical member vertically movable and telescopically arranged on the outer side of the inner cylindrical member and having an annular end surface inclined to the rotating axis of the wheel and engageable with a side surface of the tire in an air-tight manner; a wheel cap-shaped jig for tire and rim assembling substantially in the form of a disc having a periphery being progressively reduced in the rotating direction of the wheel as being remoter from the wheel and the maximum diameter being not smaller than the outer diameter of the rim and further provided with a pin engageable in at least one bolt-through aperture of the wheel; holding means for holding the wheel together with the wheel cap-shaped jig arranged on the other end of the rim such that the rotating axis of the wheel is coaxial to the holding means on the side remote from the support surface; a pair of arm members rotatable about the rotating axis of the wheel in opposite directions; guide rollers secured to the arm members for radially outwardly expanding bead portions of the tire, respectively, and restraining rollers secured to the arm member movably in the directions of the rotating axis of the wheel for urging the bead portion of the tire toward the inner cylindrical member, whereby the pair of arm members are revolved to assemble the tire onto the wheel, and while inner pressure is applied into the tire through a clearance between the bead portion and the rim, the outer cylindrical member is lowered, thereby progressively fitting the bead portions onto the rim and filling the inner pressure into the tire.

It is preferable that the wheel is arranged on the support surface of the inner cylindrical member in such a manner that a well of the wheel is positioned at the side remote from the support surface and inner pressure is applied at the side remote from the well.

The wheel cap-shaped jig supported on the end surface of the wheel arranged on the vertically movable table has the periphery whose outer diameter progressively reduces outwardly in the rotating axial direction of the wheel. Therefore, the bead portions of the tire arranged on the wheel in the inclined state can smoothly move or ride over the flange of the rim of the wheel so that the bead portions are not subjected to any local excessive force in the tire and rim assembling.

In applying the inner pressure into the tire mounted on the rim, moreover, the outer cylindrical member to be in close contact with the side surface of the tire which has an annular end surface inclined to the rotating axis of the wheel. Therefore, the bead portion is progressively fitted onto the rim little by little as the outer cylindrical member lowers. In other words, the bead portions can be fitted onto the rim under the action of relatively low inner pressure, inasmuch as whole the bead portions of the tire are not simultaneously urged to the rim. According to the invention, therefore, the bead portions of the tire undergo little deformation in comparison with the prior art simultaneously urging whole the bead portions to the rim.

The invention will be more fully understood by referring to the following detailed specification and claims taken in connection with the appended drawings.

BRIEF DESCRIPTION OF THE DRAWINGS

FIG. 1 is an explanatory view illustrating a tire arranged on a wheel in one step of the method according to the invention;

FIG. 2 is an explanatory view illustrating a wheel cap-shaped jig arranged on the wheel in the method according to the invention;

FIG. 3a is an explanatory view illustrating a state of one bead portion of the tire being fitted onto the wheel viewed from the side of the wheel cap-shaped jig in one step of the method according to the invention;

FIG. 3b is an explanatory view illustrating a state of the one bead portion being assembled onto the wheel in the method according to the invention;

FIG. 4 is an explanatory view illustrating a state of bead portions assembled onto the wheel in the method according to the invention;

FIG. 5a is an explanatory view illustrating one step of applying inner pressure into the tire mounted on the rim according to the invention;

FIG. 5b is an explanatory view illustrating another step of applying inner pressure into the tire mounted on the rim according to the invention;

FIG. 6 is an explanatory view illustrating a state applied with inner pressure into the tire mounted on the rim according to the invention;

FIG. 7 is a front view illustrating an apparatus according to the invention;

FIG. 8 is a side view illustrating the apparatus shown in FIG. 7;

FIG. 9 is a partial view illustrating principal parts of the apparatus shown in FIG. 7;

FIG. 10a is a graph illustrating the change in distance at circumferential positions from the rim flange to the rim line of a tire mounted on the rim and filled with inner pressure by the use of the apparatus according to the invention; and FIG. 10b is a graph illustrating the change in distance at circumferential positions from the rim flange to the rim line of a tire mounted on the rim and filled with inner pressure by the use of the apparatus of the prior art.

DESCRIPTION OF THE PREFERRED EMBODIMENTS

As shown in simplified in FIG. 1, a wheel 12, on which a tire 10 is intended to be mounted, is supported on one end surface of an inner cylindrical member 14 having a flat support surface and being arranged movably in vertical directions in the rotating axial directions of the wheel 12. A sheet 16 made of a rubber or a rubber-like elastomer is attached to the support surface of the inner cylindrical member 14 so that the wheel 12 engages the support surface of the inner cylindrical member 4 in an air-tight manner over the entire circumference of the wheel. The rotating axis of the wheel 12 is substantially perpendicular to the end surface of the cylindrical member 4. Moreover, the wheel 12 is preferably arranged so that its bottom or well 12a is on the side of a wheel cap-shaped jig remote from the inner cylindrical member for a reason which will be explained later.

As shown in simplified in FIG. 2, the wheel 12 generally includes a rim 22 on which bead portions of the tire 10 are to be fitted and held, and a disc 24 for holding the rim 22. The disc 24 is provided with a plurality of bolt-through-apertures 26 formed in the disc 24 spaced from one another circumferentially of the disc 24 for extending therethrough fixing bolts (not shown) on a wheel hub of the vehicle to integrally fix the wheel 12 to an axle of a vehicle with nuts threadedly engaged on the fixing bolts. Furthermore, the wheel is provided with an axle receiving hole 28 formed at the center of the disc 24 for receiving a distal end of the wheel hub of the vehicle. As shown in FIG. 1, an outer cylindrical member 18 is arranged on the outer side of the inner cylindrical member 14 in a telescopic relationship therewith to surround it. The outer cylindrical member 18 is movable in vertical directions and in the axial directions of the wheel 12 independently from the inner cylindrical member 14. The annular end surface of the outer cylindrical member 14 on the side of the wheel is inclined to the rotating axis of the wheel 12.

A wheel cap-shaped jig 30 adapted for readily fitting the bead portions of tire onto the wheel is arranged so as to abut against the rim 22 of the wheel 12 on the side remote from the inner cylindrical member 14. Preferably, the wheel cap-shaped jig 30 abuts against the maximum width portion of the rim 22 in the rotating axial direction of its flange. As shown in FIG. 2, the wheel cap-shaped jig 30 is substantially in symmetry in its construction with respect to its rotating axis S. The outer diameter DC of the wheel cap-shaped jig 30 at its periphery in opposition to the rim 22 is equal to or slightly larger than the maximum outer diameter DR of the flange of the rim 22. The outer diameter of the wheel cap-shaped jig 30 progressively reduces as is further from the rim 22 or in the thickness direction of the wheel cap-shaped jig 30. The wheel cap-shaped jig 30 is readily positioned relative to the wheel 12 by inserting engaging pins 32 of the wheel cap-shaped jig 30 into bolt-through-apertures 26 of the wheel 12. The wheel cap-shaped jig 30 is also formed with a centering hole 34 substantially concentric to the axle receiving hole 28 of the wheel when the engaging pins 32 are inserted into the bolt-through-apertures 26 of the wheel 12. Moreover, the maximum outer diameter DC of the wheel cap-shaped jig 30 may be at the most about 2 mm larger than that of the rim flange.

A tire 10 is then obliquely arranged relative to the wheel 12 on the inner cylindrical member 14 and having the wheel cap-shaped jig 30 secured on the rim on the side remote from the inner cylindrical member 14 as shown in FIG. 1. In other words, a pair of bead portions of the tire 10 are arranged obliquely to the rotating axis of the wheel 12, and a diametrically opposed part of one bead portion (the lower bead portion) is dropped in the well 12a to loosely fit on the bottom of the wheel. The reason why the part of the bead portion is loosely fitted on the bottom of the wheel 12 is that the outer diameter of the well 12a is smaller than the inner diameter of the bead portion 10a so that when a portion of the bead portion is dropped in the well 12a, a distance between other part of the bead portion diametrically opposed to the dropped part of the bead portion and the rotation axis of the wheel can be made substantially the same as half the outer diameter of the flange of the wheel. Thus, the fitting operation of the bead portion on the wheel 12 whose hump is larger in diameter than the bead portion 10a is easy. In connection therewith, it is preferable to arrange the wheel 12 on the support surface of the inner cylindrical member 14 such that the bottom of the wheel is positioned on the side of the wheel cap-shaped jig 30, on which side the tire is also arranged, inclined. A centering pin 36 is then inserted into the centering hole 34 of the wheel cap-shaped jig 30 and the axle receiving hole 28 of the wheel 12. It fixes the wheel cap-shaped jig 30 to the wheel 12 by a restraining plate 38 provided on the centering pin 36.

The diameters of the bead portions of the tire 10 are smaller than that of the rim 22 of the wheel 12. A pair of guide rollers 40 rotatable about the axis of the centering pin 36 are rolled in opposite directions along the tire bead portion loosely fitted on the bottom of the wheel to the position diametrically opposed to the loosely fitted position thereof. As a result, the remaining portion of the bead portion is expanded and falls by gravity onto the wheel so that the bead portion is positioned around the wheel.

This operation will be explained by referring to FIGS. 3a and 3b. In FIG. 3a, the pair of guide rollers 40 are shown in the positions when the bead portion is loosely fitted on the bottom of the rim. Starting these positions, these guide rollers 40 are rolled to move along the bead portion in opposite directions P, with the result that the remaining portion of the bead portion is fitted onto the wheel 12 as shown in FIG. 3b.

After the one bead portion has been thus positioned around the wheel 12, the other bead portion is expanded radially outwardly by means of the guide rollers 40, and a pair of restraining rollers 42 arranged outwardly of the guide rollers 40 are lowered to urge one side surface or the upper side surface of the tire downwardly. At this time the restraining rollers 42 are rolled on the side surface of the tire to revolve about the centering pin 36 in directions Q in synchronism with the rolling of the guide rollers 40 as shown in FIG. 4. Consequently, the other bead portion is progressively positioned around the wheel 12 to complete the mounting of the tire 10 onto the wheel 12. Thereafter, the guide rollers 40 and the restraining rollers 42 are raised away from the wheel 12 to their poised positions, respectively. In this operation the rolling speed of the guide rollers 40 and the restraining rollers 42 may be controlled to shorten the time required for the fitting operation.

In a preferable embodiment, when the part of the bead portion at the side of the supporting surface of the cylindrical member is dropped in the well of the wheel by the guide rollers, the guide rollers are moved at a relatively high speed until substantially half of the bead portion have been dropped in the well. Subsequently the speed of the guide rollers is reduced to a middle speed, and the guide rollers are moved at a low speed when the fitting of the bead portion is near the end since the bead portion can be more largely deformed immediately after the beginning of fitting operation. But the deformation of the bead portion to be dropped is restricted at near the end of fitting operation when almost all of the bead portion is fitted on the wheel.

Also, when the part of the bead portion at the side remote from the inner cylinder is fitted on the wheel, the rolling speed of the guide rollers 40 and the restraining rollers 42 may be controlled in accordance with the condition of fitting of bead portion. Moreover, during the aforementioned rolling, the restraining rollers 42 are pushed down towards the inner cylindrical member in parallel to a rotating axis of the wheel 12 to a position corresponding to the well 12a until a region of the half bead portion of the tire has been dropped in the well of the wheel and then pulled up upwards from the inner cylindrical member. Finally, the restraining rollers may be controlled to be spaced from the tire 10 when the fitting operation has been finished. Thus, the fitting operation can be more easily carried out.

As shown in FIG. 5a, the inner and outer cylindrical members 14 and 18 are then raised from their poised positions so that the sheet 16 of the inner cylindrical member 14 is brought into abutment against the end surface of the wheel in an air-tight manner, while the inclined annular end surface 20 of the outer cylindrical member 18 is brought into close contact with the other side surface or the lower side surface of the tire 10 over its all circumference. As a result, these members define an air-tight space in cooperation with the tire 10 and the wheel 12. Pressurized air is then supplied into the inner space 46 of the tire 10 through a space between the inner and outer cylindrical members 14 and 18 from a piping 44 connected to a pressurized air source, such as an air compressor (not shown). Consequently, the bead portion positioned on the side of the wheel cap 38 can be brought into close contact with the rim 22 of the wheel 12 in an air tight manner.

The supplying of pressurized air into the tire is further continued, while the outer cylindrical member 18 is lowered relative to the inner cylindrical member 14. Before this downward movement of the outer cylindrical member 18, the inclined annular end surface 20 thereof is in close contact with the side surface of the tire 10 over its entire circumference to restrain the bead portion from moving outwardly in the width direction of the rim. However, as a result of the downward movement of the outer cylindrical member 18, such a restraining of the bead portion is released progressively owing to the inclination of the annular end surface 20 of the outer cylindrical member 18. As shown in FIG. 5b, consequently, the part of the bead portion in opposition to the part of the annular end surface of the outer cylindrical member 18 remotest from the wheel cap-shaped jig 30 first moves or rides over one hump of the wheel and comes in close contact with the rim as shown FIG. 5b. As the outer cylindrical member 18 is progressively lowered, the remaining part of the bead portion progressively rides over the hump of the wheel until the bead portion comes in close contact with the rim over its whole circumference as shown in FIG. 6. Thereafter, the inner and outer cylindrical member 14 and 18 are lowered to complete all of the operations for mounting the tire onto the rim and for filling the tire with inner pressure.

According to the invention, therefore, whole the bead portions need not ride over the humps of the rim simultaneously. Only the parts of the bead portions obliquely intersecting with the humps need to ride over the humps of the wheel little by little. Accordingly, only small force suffices to cause the bead portions to ride over the humps of the rim. While the pressure of the order of 4 to 6 kg/cm$^2$ has been required in the prior art, the pressure of the order of 1 kg/cm$^2$ suffices to bring bead portions into close contact with a rim according to the present invention. Therefore, the bead portions of a tire are not subjected to excessive forces in mounting the tire on the rim.

A preferable apparatus for carrying out the method described above is shown in FIGS. 7 and 8. The apparatus 50 comprises a table 56 movable upward and downward along guides 54 by means of a reciprocating movable fluid pressure cylinder 52. The table 56 supports thereon an inner cylindrical member 14 and has reciprocating movable fluid pressure cylinders 58 fixed to the table 56. An outer cylindrical member 18 is secured to output shafts of the fluid pressure cylinders 58 to surround an inner cylindrical member 14 with suitable sealing members interposed therebetween so that the outer cylindrical member 18 is movable in the axial directions of the output shafts relative to the inner cylindrical member 14.

An annular end surface of the outer cylindrical member 18 is inclined to the rotating axis of a wheel 12 as clearly shown in FIG. 8. The degree of the inclination of the annular end surface is within a range to fulfill conditions that the annular end surface is in close contact with one side surface of a tire over its whole circumference when the outer cylindrical member 18 is in its extended position by the action of the fluid pressure cylinders 58, and annular end surface partially progressively moves away from the side surface of the tire as the outer cylindrical member 18 is being lowered relatively to the inner cylindrical member 14, and the annular end surface is completely out of contact with the side surface of the tire in the lowered position of the outer cylindrical member 18. The difference between the maximum and minimum heights of the inclined annular end surface is of the order of 5 to 20 mm in the rotating axial direction of the wheel 12. The outer cylindrical member 18 forms an air-tight space with the inner cylindrical member 14 when the outer cylindrical member 18 is in contact with the side surface of the tire. The outer cylindrical member 18 may be formed in its side surface with through-apertures (not shown) through which pressurized fluid may be supplied into the airtight space from an operating pressurized fluid source (not shown). A sheet 16 is provided on the end surface of the inner cylindrical member 14 as a support surface to keep the end surface in abutment against the rim 22 of the wheel 12 in the air-tight manner.

The apparatus 50 further comprises a shaft 60 arranged coaxially in opposition to the inner and outer cylindrical members 14 and 18 arranged coaxially telescopically. The shaft 60 has a centering pin 36 and restraining plate 38. When the inner cylindrical member 14 is raised, the centering pin 36 is fitted into the axle receiving hole of the wheel 12 arranged on the support surface of the inner cylindrical member 14 for centering the wheel 12 on the inner cylindrical member 14. The restraining plate 38 serves to urge a wheel cap-shaped jig 30 arranged coaxially to the rim of the wheel 12 remote from the inner cylindrical member against the wheel 12.

As shown in FIG. 9, the shaft 60 further comprises a first bevel gear 62 integrally fixed thereto on the side remote from the centering pin 36, and a second bevel gear 66 integrally fixed to a rotatable sleeve 64 secured to the shaft 60 rotatably relative thereto. The first and second bevel gears 62 and 66 are in mesh with a third bevel gear 70 fixed to the output shaft of a driving motor 68 so that the shaft 60 and sleeve 64 are rotated in opposite directions. Moreover, the shaft 60 and the sleeve 64 are supported rotatably relative to each other on the housing of the apparatus with suitable bearing means, respectively.

Arm members 71 and 72 are fixed to the shaft 60 and the sleeve 64, respectively, and extend substantially perpendicularly to the rotating axes of the shaft 60 and the sleeve 64. The arm members 71 and 72 form a pair of revolving units and rotate in opposite directions by energizing the driving motor 68. A support plate 74 is secured to each of the arm members 71 and 72 so as to be shiftable in the extending directions of the arm member or in the directions perpendicular to the rotating axis of the shaft 60. A guide roller 40 is mounted on each of the support plates 74 substantially in parallel with the rotating axis of the shaft 60. Moreover, fluid pressure cylinders 76 are mounted on the support plates 74, respectively, whose output shafts are reciprocating movable in parallel with the rotating axis of the shaft 60. Restraining rollers 42 are secured to the output shafts of the fluid pressure cylinders 76, respectively. With this arrangement, the restraining rollers 42 are able to extend and retract in the extending directions of the shaft 60 and urge the side surface of the tire relative to the wheel 12. The guide rollers may of course be mounted on the support plates 74 by means of other fluid pressure cylinders.

In order to compare the apparatus according to the invention with the prior art apparatus, the following experiment was carried out. Tires of 195/60 R14 were mounted on rims of 6-JJ×14 by the use of the apparatus according to the invention including an outer cylindrical member having an inclined end surface of a 15 mm difference in height and filled with inner pressure of 2.0 kg/cm$^2$. On the other hand, tires of 195/60 R14 were mounted on rims of 6-JJ×14 by the use of the apparatus of the prior art and filled with inner pressure of 2.0 kg/cm$^2$. Distances between rim flanges and rim lines of tire side surface rubbers were measured over the whole circumferences of the tires to compare uniformities of close contact therebetween.

Results of comparison of pressure required for fitting tires on rims of wheels are shown in the following Table and results of comparison of fitting properties of tires on wheels are shown in FIGS. 10a and 10b. In the Table, well positions I and II correspond to a case of the well at the side of the supporting surface and a case of the well at the side remote from the supporting surface, respectively. Solid lines in FIGS. 10a and 10b denote distances from the rim flange to the rim lines positioned on the outer side of the vehicle, while broken lines illustrate distances from the rim flange to the rim lines located on the inner side of the vehicle.

|  | Well Position I | Well Position II |
| --- | --- | --- |
| Invention (sloped end surface) | 0.4 | 0.5 |
| Prior Art | 0.7 | 0.5 |

It will be seen from the above Table that according to the present invention the pressure required for fixing the tire on the wheel can be reduced than the prior art and further the tire can be fixed on the wheel with use of lower pressure. Furthermore, it will be seen from FIG. 10, the tire filled with compressed air by the apparatus of the present invention can be more tightly fixed on the wheel than the conventional apparatus of the prior art.

It is clear from the results shown in FIGS. 10a and 10b that the tires mounted on the rims and filled with pressurized air by means of the apparatus according to the invention can bring bead portions of them into close contact with the rims more uniformly than those of tires mounted on the rims and filled with pressurized air by means of the apparatus of the prior art.

As can be seen from the above explanation, the present invention can not only fix the tire on the wheel with use of compressed air of relatively low pressure but also bring bead portions of tires into close contact with rims more uniformly than those of the prior art. According to the invention, moreover, the bead portions are scarcely deformed in mounting a tire on a rim. Therefore, it is possible to eliminate various problems such as vibrations, air leakage and the like due to deformations of the bead portions of the tire. Moreover, while the mounting of a tire on a rim and filling the tire with inner pressure have been carried out by means of separate apparatuses in the prior art, it should be understood that the present invention enables such two operations to be performed by a single apparatus. According to the invention, therefore, it is possible to shorten the time for the operations and to save the spaces for installing apparatuses and for storing tires with rims.

While the invention has been particularly shown and described with reference to preferred embodiments thereof, it will be understood by those skilled in the art that the foregoing and other changes in form and details can be made therein without departing from the spirit and scope of the invention.

What is claimed is:

1. A method for assembling a tire and a wheel and filling inner pressure into the tire, the wheel having a rim for mounting and holding the tire thereon and a disc formed with a plurality of bolt-through apertures, comprising steps of: providing an inner cylindrical member vertically movable and having a support surface engageable with one end of the rim in an air-tight manner and an outer cylindrical member telescopically arranged on the outer side of the inner cylindrical member and having an annular end surface inclined to the rotating axis of the wheel and engageable with a side surface of the tire in an air-tight manner; arranging the wheel on the support surface of the inner cylindrical member such that the rotating axis of the wheel is substantially perpendicular to the support surface; arranging a wheel cap-shaped jig substantially in the form of a disc on the end surface of the wheel remote from the support surface, said wheel cap-shaped jig having a periphery being progressively reduced in the rotating axial direction as being remote from said end surface of the wheel; arranging the tire to be assembled on the wheel so as to be inclined relative to the wheel; progressively expanding bead portions of the tire radially outwardly to assemble them onto the rim along their circumferences; bringing the inner cylindrical member into an air-tight engagement with the rim and simultaneously bringing the annular end surface of the outer cylindrical member into an air-tight engagement with the side surface of the tire; and applying inner pressure into the tire through a clearance between the bead portion and the rim, while lowering the outer cylindrical member, thereby progressively fitting the bead portions onto the rim and filling the inner pressure into the tire.

2. The method as set forth in claim 1, wherein in expanding the bead portions radially outwardly, a pair of guide rollers are rolled to move along the bead portion from one side thereof to the diametrically opposed portion in opposite directions.

3. The method as set forth in claim 1, wherein in assembling the bead portions of the tire onto the rim, a pair of guide rollers are rolled to move along one of the bead portions from one side thereof to the diametrically opposed portion in opposite directions to expand the bead portion so as to fall onto the rim by gravity, and then the pair of guide rollers are rolled to move along the other bead portion from one side thereof to the diametrically opposed portion in opposite directions to expand the bead portion, while a pair of restraining rollers are lowered to urge the upper side surface of the tire including the other bead portion downwardly.

4. The method as set forth in claim 1, wherein said wheel is arranged on the support surface of the inner cylindrical member in such a manner that a well of the wheel is positioned at the side remote from the support surface and the inner pressure is applied at the side remote from the well.

* * * * *